(No Model.)

W. H. HAWS.
BOTTOM FOR BESSEMER CONVERTERS.

No. 556,539. Patented Mar. 17, 1896.

Witnesses

Inventor
William H. Haws,
By Alexander Davis,
Attorneys

UNITED STATES PATENT OFFICE.

WILLIAM H. HAWS, OF JOHNSTOWN, PENNSYLVANIA, ASSIGNOR OF ONE-HALF TO MAHLON W. KEIM, OF SAME PLACE.

BOTTOM FOR BESSEMER CONVERTERS.

SPECIFICATION forming part of Letters Patent No. 556,539, dated March 17, 1896.

Application filed November 18, 1895. Serial No. 569,351. (No model.)

*To all whom it may concern:*

Be it known that I, WILLIAM H. HAWS, a citizen of the United States, residing at Johnstown, in the county of Cambria and State of Pennsylvania, have invented certain new and useful Improvements in Bottoms for Bessemer Converters, of which the following is a specification, reference being had therein to the accompanying drawings.

This invention relates to improvements in the bottoms of Bessemer converters, and it has for its object to provide a more durable and more economical bottom than that now in use.

A further object of the invention is to provide means whereby fire-clay or refractory-material tuyeres may be used in connection with the improved removable fire-brick bottom, as will hereinafter more fully appear and be particularly set forth in the claim appended.

Figure 1:
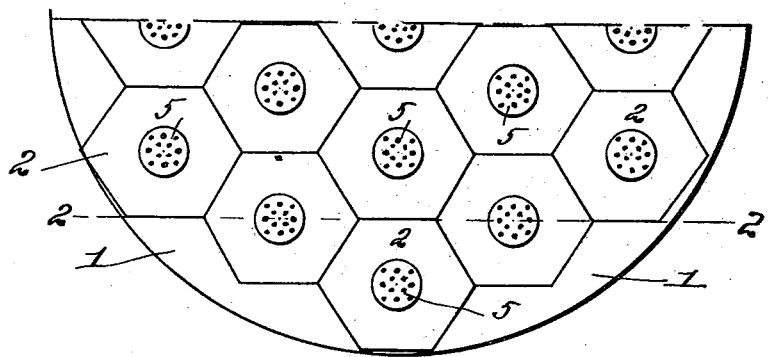
Figure 2:
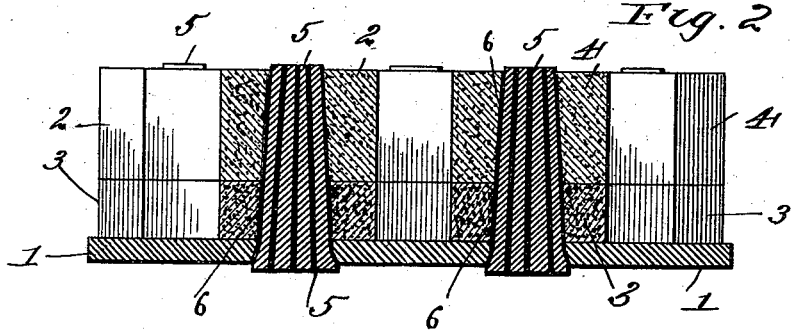
Figure 3:
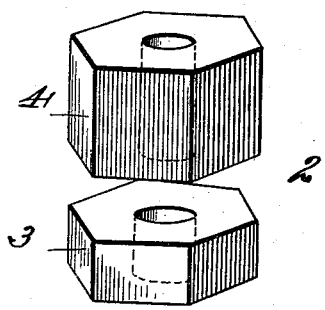

In the drawings, Figure 1 is a plan view of a portion of a converter-bottom. Fig. 2 is a vertical section thereof on line 2 2 of Fig. 1. Fig. 3 is a detail of one of the sectional fire-bricks.

In the usual construction steel-converter bottoms are formed of a suitable refractory material about eighteen inches in thickness, and the tuyeres extend upwardly through it. This bottom is used until it has burned down to within about six inches of the bottom plate, or to what is known as the "danger-line"—that is, until there is danger of the bottom plate of the converter being burned out. The unburned portion of the bottom and tuyeres are then knocked off the bottom plate and an entirely new bottom and a new set of tuyeres are put in. One of the objects of this invention is to save this unburned portion of the bottom of refractory material so that it may be used over and over again, as will presently appear.

Referring to the various parts by numerals, 1 designates the plate forming the converter-bottom, which may be of any usual or desired form or construction. Supported by this plate is the removable bottom of refractory material, which, as shown, is formed of blocks or bricks, which are hexagonal in horizontal section, though they may be prismatic blocks of any desired form. These blocks are of a suitable length—about eighteen inches—and are all of the same size, in order that they may be placed on the plate 1 without special arrangement, and yet properly fit together, tight joints being formed between them. Each of these blocks or bricks is formed of two horizontal sections of unequal length, the lower one, 3, being the shorter one and being about six inches in length. The upper section, 4, is about 12 inches in length and is formed of hard refractory material, while the lower section may be formed of any suitable material and need not be as hard as the upper section. These blocks or a suitable number of them are each provided with a central vertical aperture, through which the fire-clay tuyeres 5 project, as clearly shown in Fig. 2. These tuyeres serve to hold the two sections of the blocks together, and also maintain the whole of the removable bottom rigidly in its place. The tuyeres are secured to the bottom plate in any suitable manner. In the drawings the tuyeres are tapered toward their upper ends, and the bricks 2 are provided with correspondingly-tapered apertures, so that they may be forced down upon the tuyeres, thereby forming very close joints around the tuyeres. The fire-clay tuyeres burn out more rapidly than the bricks 2. Therefore if these joints are not tight the molten metal in the converter will find its way between the tuyeres and the bricks and burn out the tuyeres long before it destroys the bricks. It is important, therefore, that these joints be tight, so as to confine the action of the metal to the tops of the tuyeres in order to prolong their life as much as possible.

In the drawings a tuyere is shown projecting through each brick 2; but, as is manifest, where it is not necessary to do this solid bricks may be interposed between the bricks through which the tuyeres project.

It will thus be seen that I provide a removable converter-bottom which may be placed in position without special arrangement, as the bricks forming it are of the same size and form and have like perforations for the tuyeres. It will also be seen that I provide a bottom of such construction that one-third of it is saved and may be used over and over again, thus effecting a material saving.

Just before the tuyeres are inserted in the bottom-plate 1 and the bricks 2 they are covered with a thin coating of soft fire-clay or other fireproofing compound, as at 6 in Fig. 2, so that when they are in place any imperfections in either the tuyere or the opening in the brick will be filled and a very tight joint made, which will aid materially in protecting the tuyere. When the bricks 2 and all the tuyeres are in place, the joints between the bricks are filled in with a "cream" or "slurry" of fire-clay, thereby making an almost solid bottom of fire-brick, which will be very durable and which will protect the sides of the tuyeres and the sides of the bricks from the action of the metal in the converter.

It will be understood that while the tapered hole in the bricks is the preferred form a hole having parallel sides may be used. It will also be understood that the bricks 2 may be made in three or more sections, if desired, and I do not limit myself to making the bricks in two sections, as shown in the drawings.

Having thus fully described my invention, what I claim is—

In a bottom for converters, the combination of a bottom-plate 1, a series of suitably-formed bricks supported on said plate, each of said bricks consisting of an upper section and a lower section, said sections being formed with a central aperture, and a series of tuyeres fitting said apertures and carried by the plate 1, substantially as described.

In testimony whereof I affix my signature in presence of two witnesses.

WM. H. HAWS.

Witnesses:
CHARLES C. GREER,
ALEX. N. HART.